United States Patent [19]

Nichols, Jr. et al.

[11] 4,398,687

[45] Aug. 16, 1983

[54] THRUST DEFLECTOR AND FORCE AUGMENTOR

[75] Inventors: James H. Nichols, Jr., Hyattsville, Md.; Roger J. Furey, Vienna, Va.; Robert J. Englar, Derwood, Md.; David G. Lee, Reston, Va.

[73] Assignee: The United States of America as represented by the Secretary of the Navy, Washington, D.C.

[21] Appl. No.: 238,264

[22] Filed: Feb. 25, 1981

[51] Int. Cl.³ .......................................... B64C 21/04
[52] U.S. Cl. ............................ 244/207; 239/265.23; 416/20 R; 416/90 A
[58] Field of Search ................. 244/12.5, 23 D, 207, 244/110 B; 416/20 R, 90 A; 239/265.23, DIG. 7; 60/231; 114/162, 278; 440/67

[56] References Cited

U.S. PATENT DOCUMENTS

| | | | |
|---|---|---|---|
| 2,868,479 | 1/1959 | Kadosch | 244/207 |
| 3,670,994 | 6/1972 | Kizilos | 244/207 |
| 3,680,511 | 8/1972 | English | 114/162 |
| 3,830,450 | 8/1974 | Williams et al. | 416/20 R |
| 3,971,534 | 7/1976 | Grotz | 244/207 |
| 4,131,390 | 12/1978 | Schmidt | 416/90 A |
| 4,137,008 | 1/1979 | Grant | 416/90 A |

OTHER PUBLICATIONS

Nichols, "Advanced Circulation Control Wing System for Navy STOL Aircraft", AIAA-80-1825, Aug. 4–6, 1980.

Primary Examiner—Charles E. Frankfort
Attorney, Agent, or Firm—R. F. Beers; L. A. Marsh

[57] ABSTRACT

A non-moving fluid thrust deflector and force augmentor is disclosed for aerodynamic and hydrodynamic vehicles and devices. When the deflector is utilized in an aerodynamic application and in conjunction with a thrust producer and a plenum, upon pressure initiation within the plenum, a jet sheet issues and remains attached to a specially designed wing having a rounded trailing edge by balancing reduced static pressure with centrifugal force, and thus provides a controlled resultant force or thrust in some direction other than that corresponding to the original flow. Upon application to hydrodynamic vehicles, the deflector is placed in the propulsor stream and provides turning or pitching forces to the vehicle without any deflection of itself. These applications require no mechanical moving components to deflect or augment the thrust or force, and thus yield considerable reductions in weight and complexity.

2 Claims, 11 Drawing Figures

CCW/USB THRUST REVERSER

CIRCULATION CONTROL WING/UPPER SURFACE BLOWING AND CIRCULATION CONTROL WING INTEGRATED CONFIGURATION

FIG. 2 APPLICATION OF CCW/USB AND CCW TO A STOL AIRCRAFT CONFIGURATION

CCW/USB THRUST REVERSER

CCW/USB VERTICAL TAKEOFF AND LANDING CONFIGURATION

SIMPLIFIED THRUST DEFLECTING NOZZLE

PROPULSOR SLIPSTREAM THRUST DEFLECTOR

CHANNEL FLOW TURNING DEVICE

GEOMETRIC AND OPERATING PARAMETER RANGES FOR CCW/USB NON-MOVING THRUST DEFLECTOR AND FORCE AUGMENTOR

CCW/USB TURNING ANGLE AND THRUST RECOVERY EFFICIENCY

HIGH LIFT CAPABILITY OF CCW/USB STOL AIRCRAFT

THRUST DEFLECTOR AND FORCE AUGMENTOR

BACKGROUND OF THE INVENTION

1. Field of the Invention

This invention relates to non-mechanical means for deflection of aerodynamic or hydrodynamic propulsive flows. More specifically, this invention relates to a non-mechanical means for deflection of aerodynamic or hydrodynamic propulsive flows that provides a resultant force or thrust in some direction other than that corresponding to the original flow. This non-mechanical means, as applied to aircraft with wing-mounted engines, deflects engine thrust while augmenting lift, thus providing short takeoff and landing of STOL type aircraft; and, as applied to vertical takeoff and landing of VTOL type aircraft, provides thrust deflecting and reversing capabilities for the aircraft, which requires no moving mechanical flow deflection devices. Moreover, the non-mechanical means as applied to water-borne vehicles may be placed in the propulsor stream and provide turning or pitching forces to the vehicle without any deflection of itself.

2. Description of the Prior Art

Existing mechanical high lift devices, such as flaps and slats, are not able to generate sufficient lift to produce good STOL capabilities for heavier aircraft. A recently developed powered high lift system, known as Upper Surface Blowing (USB), uses a mechanical wing flap to deflect engine thrust of an engine mounted on the wing upper surface above and ahead of the flaps. The downward deflected jet sheet augments lift by entraining flow around the wing, and adds the vertical component of deflected thrust to the lift generated aerodynamically by the wing alone. Such flap required is mechanically complex, large, and heavy, and must be retracted for cruise flight and mechanically deployed for takeoff or landing, and produces maximum thrust deflections of only 60°-70°. The USB utilized alone does not provide vertical flight, that is, thrust deflection near 90° from the horizontal, or thrust reverser capability without the impractical addition of considerably more complex mechanical devices. Similarly, a hydrodynamic device in a propulsor slipstream is also limited by the angle at which the flow separates from it, and mechanical deflection of the device up to that angle is not required.

SUMMARY OF THE INVENTION

The present invention relates to a non-mechanical (no moving parts) thrust deflector and force augmentor for aerodynamic and hydrodynamic vehicles and devices.

An object of this invention is to provide a simple and effective aerodynamic/hydrodynamic force deflector/generator which eliminates the complexity, weight and inefficiency of mechanical devices currently used for these purposes, by eliminating all moving components.

Another object of this invention is to provide a circulation control wing (CCW) round trailing edge that is immensely effective in entraining flow that provides additional lift augmentation by freestream flow field turning, above and beyond the force generated by deflected engine thrust.

Still another object of this invention is to provide varied deflection by varying the flow rate through the CCW slot by use of an internal valve.

A further object of this invention is to provide a CCW/USB deflector and augmentor device that requires no retraction to return to a cruise configuration, and thus provides STOL, V/STOL and thrust reverser capability all in one configuration.

Another object of this invention is to provide similar advantages when this invention is used in a hydrodynamic propulsor slipstream, where augmented, instantly available control forces are provided and the need for reversible propellers or variable blade pitch is eliminated.

Other objects and many advantages of this invention will be readily appreciated as the same becomes better understood by reference to the following detailed description when considered in connection with the accompanying drawings wherein:

DESCRIPTION OF THE PREFERRED EMBODIMENT

Figure 1:
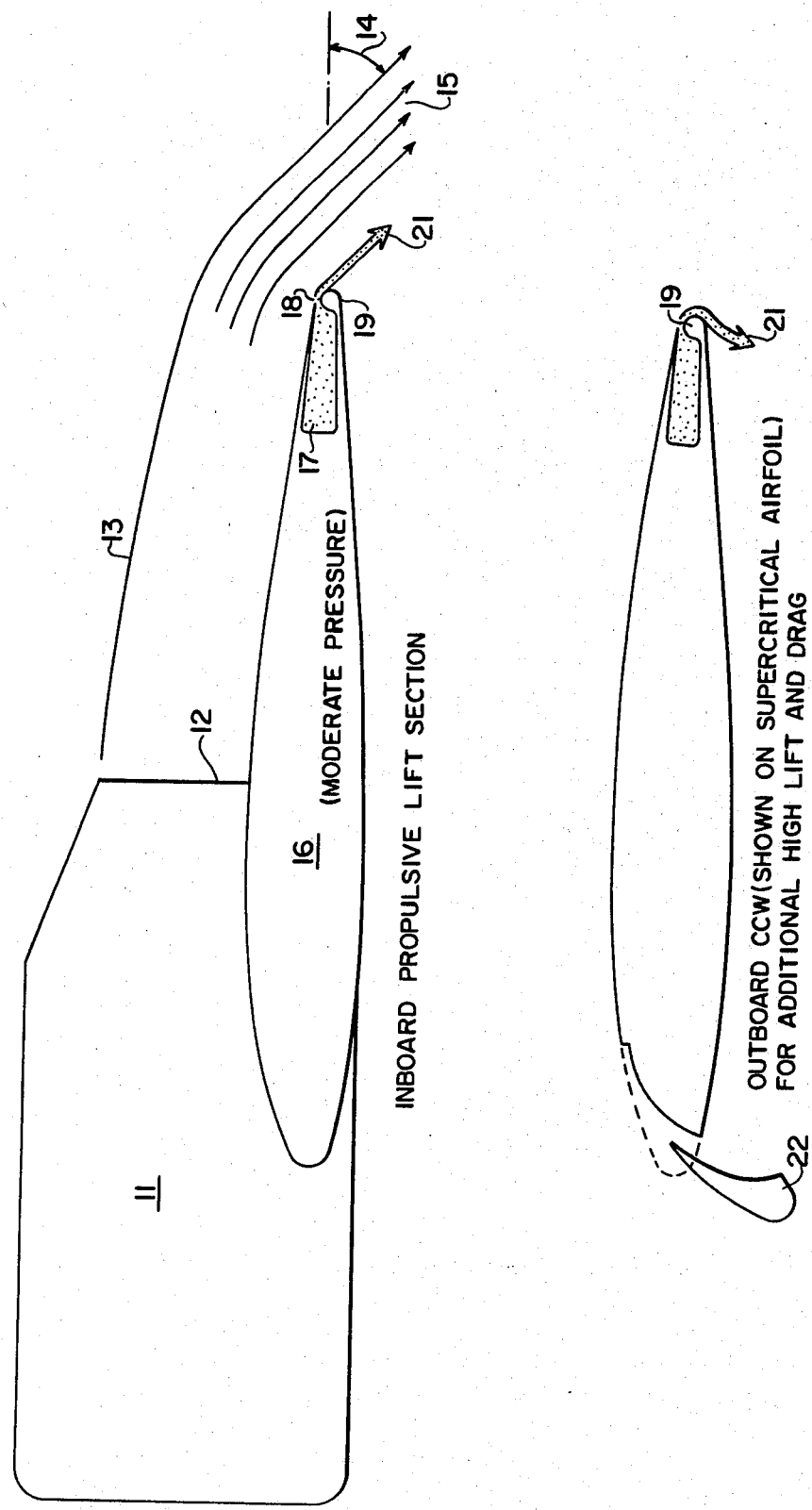
FIG. 1 shows a circulation control wing/upper surface blowing and circulation control wing integrated configuration.

FIG. 1 shows the present invention applied to an aircraft wing 16 on the upper surface of which is mounted the aircraft's thrust engine 11. The previously used complex mechanical flap at the wing trailing edge is replaced by air-supply plenum 17, rounded trailing edge 19 and slot 18 from which issues a circulation control (CC) jet sheet 21 produced by pressurized air from plenum 17. The CC jet sheet 21 remains attached to round trailing edge 19 by balancing reduced static pressure with centrifugal force. Thus, turning angles of 180° are theoretically possible and angles of over 165° have been accomplished in initial testing. The jet sheet 21 produces very high negative pressures (suction) along rounded trailing edge 19. And, when jet engine exhaust 13 passes over the upper surface of rounded trailing edge 19, it is entrained into low pressure jet sheet 21 and is significantly deflected 15. Thrust deflection angle 14 is dependent on plenum 17 pressure, jet sheet 21 thickness and momentum (and thus the static pressure over rounded trailing edge 19), as well as the characteristics of engine exhaust 13 itself.

For STOL type aircraft operation, engine thrust deflection angles 14 range from 0 to 70-75 degrees and are obtained by increasing plenum 17 pressure until appropriate deflection angle 14 is achieved. Air supplied to plenum 17 can move at the speed of sound when initially activated, thus deflected thrust 15 can be varied from 0 degrees to a desired angle almost instantaneously. During takeoff, the aircraft can accelerate at maximum horizontal thrust, that is, no thrust deflection, and instantaneously achieve thrust deflection 15 and lift required for lift-off by initiating plenum 17 blowing after a very short ground run. Once flight is obtained, the aircraft achieves its cruise configuration by halting air supplied to plenum 17. Such combined circulation controlled wing (CCW) and engine thrust deflection 15 from upper surface engines is hereby called CCW/USB.

Figure 2:
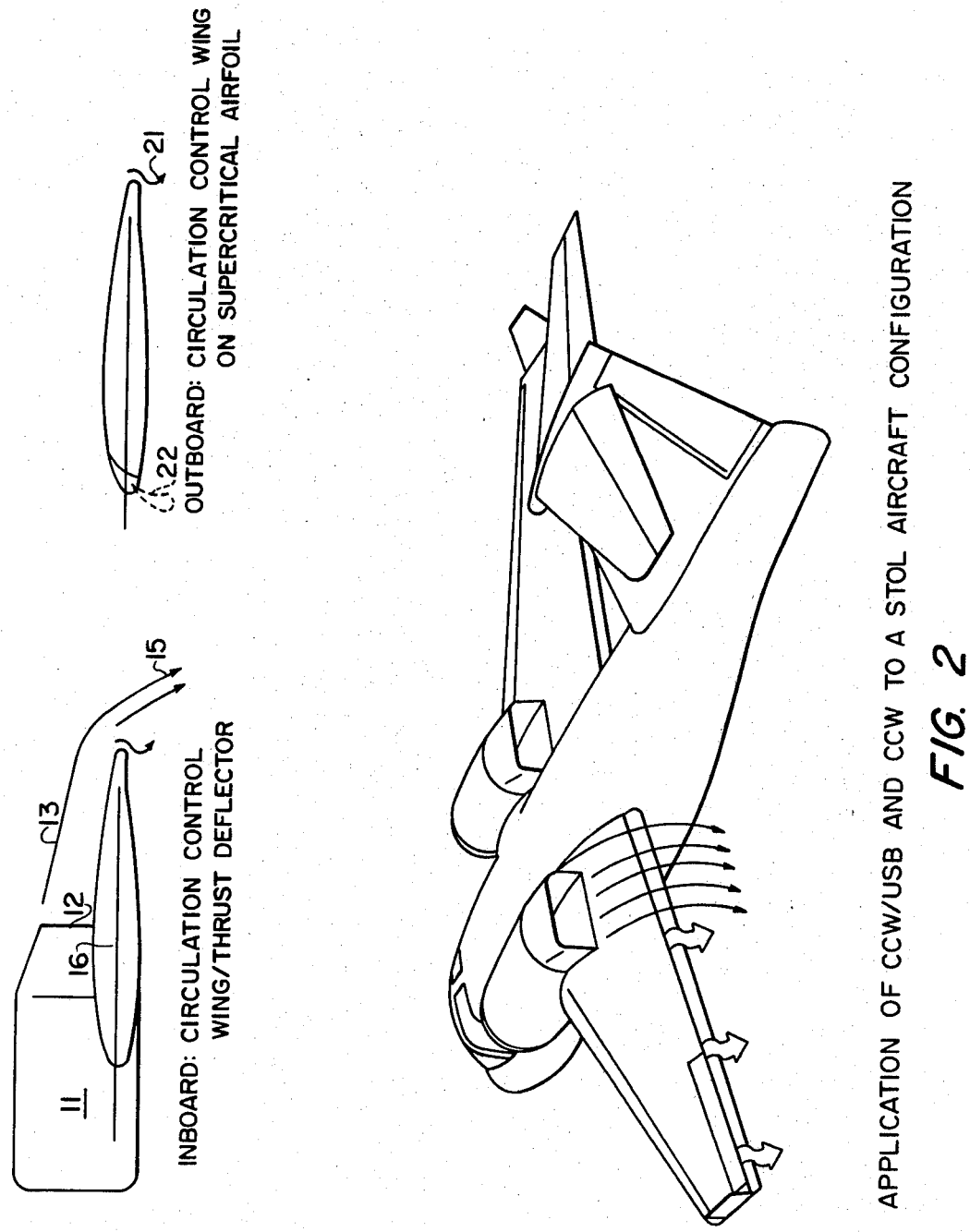
FIG. 2 shows an application of CCW/USB and CCW to a STOL aircraft configuration.

FIG. 2 illustrates a typical CCW/USB STOL configuration where the CCW/USB is supplemented on the outboard wing panels by an independent CCW high lift wing. The outboard section is critical to the application of CCW/USB as it provides additional high lift for take-off and landing with a very low air supply requirement, as well as, provides additional induced drag to offset engine thrust allowing equilibrium flight when flying down steep approach glide slopes. Moreover, the CCW section provides instantaneous modulated lift for smooth, controllable transition flight.

Figure 3:
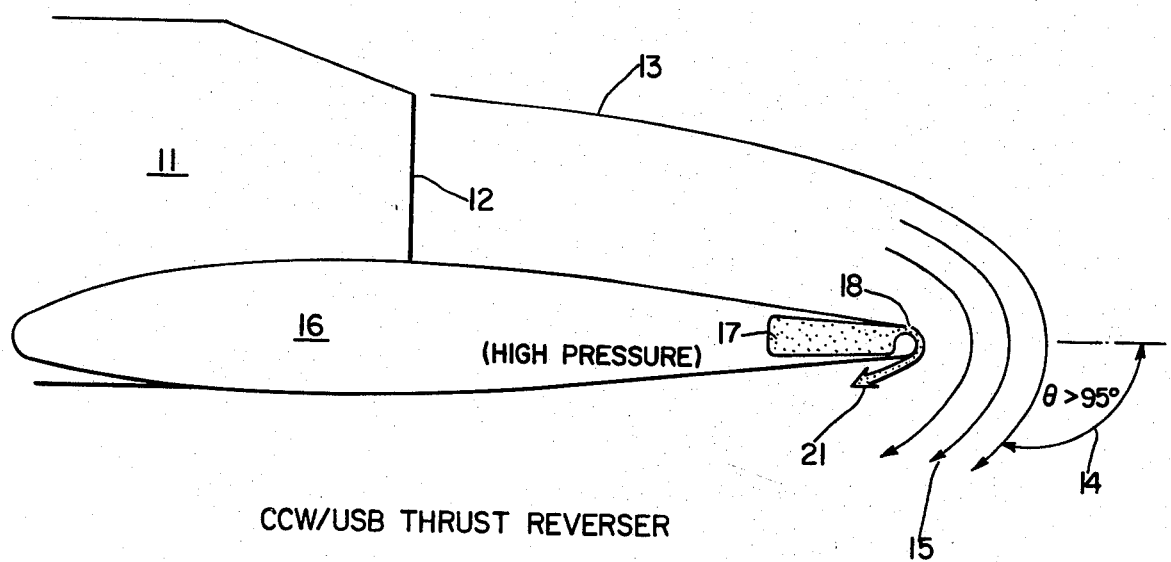
FIG. 3 shows an application of CCW/USB thrust reverser.

FIG. 3 shows wherein additional short landing capability can be achieved by use of this invention. That is, thrust deflection angles 14, significantly greater than 90-95 degrees are achieved by higher plenum 17 pressure. The invention thus becomes a no-moving part instantaneous thrust deflection 15 reverser and significantly shortens landing ground roll. Further, if plenum 17 pressure is provided by engine bleed, the resulting thrust loss due to bleed produces even greater deceleration and thus shorter stopping distance while maintaining a relatively high power setting on the engine.

Figure 4:
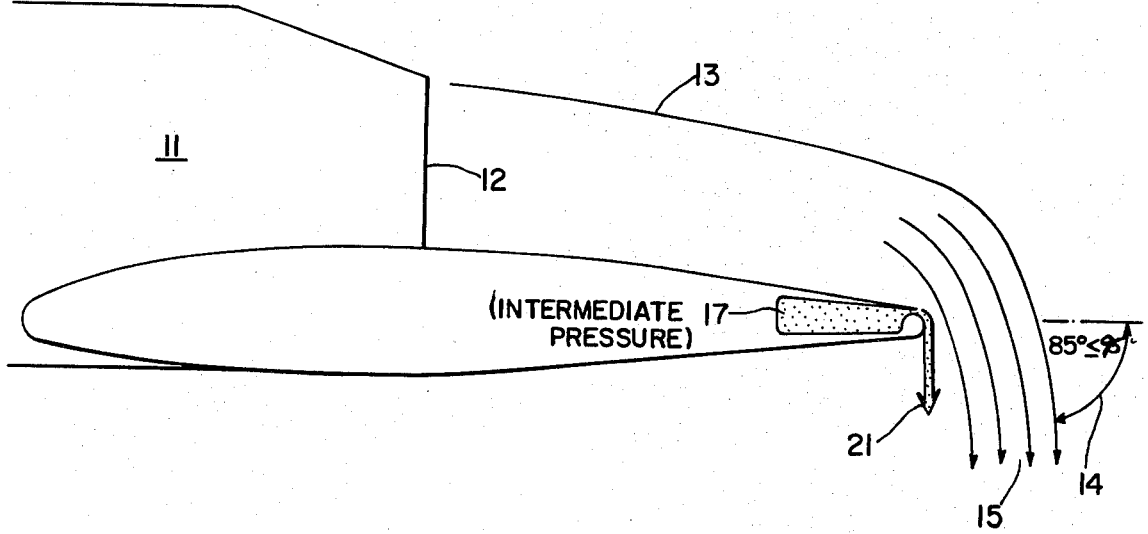
FIG. 4 shows an application of CCW/USB vertical takeoff and landing configuration.

FIG. 4 shows the CCW/USB used to provide vertical takeoff and landing (VTOL) capability, where no airspeed over the wing is required. This capability is achieved by increasing plenum 17 pressure to slightly more than in the STOL mode, and deflecting thrust 15 to the near vertical position, approximately 85° to 95°, thus lifting the aircraft weight by thrust alone. Transition to forward flight is achieved by reducing plenum 17 pressure and inclining the thrust vector aft while increasing the aerodynamic wing loading as speed increases. For VTOL application, engines larger than those required for a STOL aircraft are required since VTOL aircraft thrust/weight must be greater than 1.0 in this mode of operation.

Figure 5:
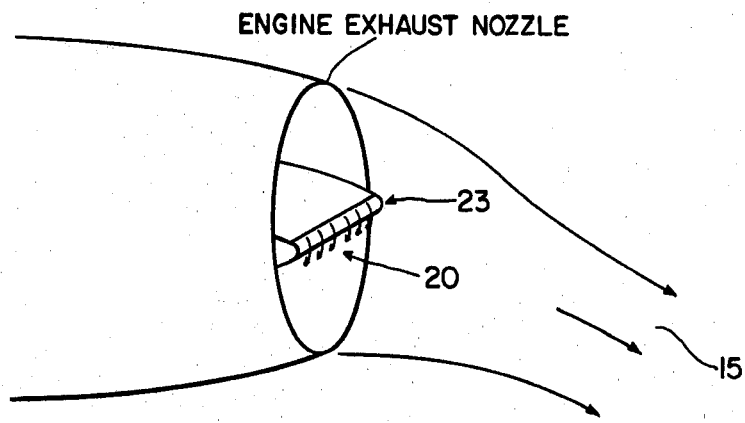
FIG. 5 shows a simplified thrust deflecting nozzle.

FIG. 5 shows an alternative in the VTOL application where the thrust deflector, that is, non-moving deflector vane 23 is not located at wing trailing edge, but rather is located within engine nozzle 12 itself. Thus, it provides deflected engine thrust 15 when plenum 17 is pressurized, and the thrust returns to undeflected when plenum 17 pressure is terminated. This invention alternative requires no location near any wing and thus replaces tilting engines, tilting nacelles, or thrust deflecting mechanical nozzles, all of which are complex devices currently proposed and/or used for various VTOL aircraft configurations.

Figure 6:
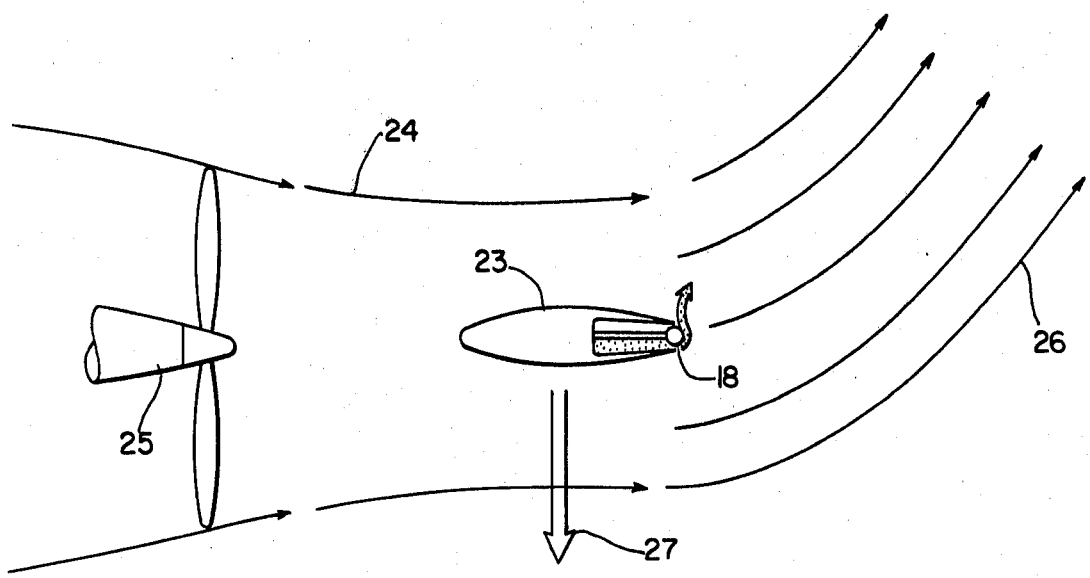
FIG. 6 shows a propulsor slipstream thrust deflector.

FIG. 6 illustrates a hydrodynamic application of this invention. This application shows a non-moving thrust deflector 23 with dual plenums and slots 18, thus producing a control surface placed in the slipstream 24 of a propeller or another freestream-energizing device. The propeller slipstream 24 is then deflected in either direction depending on which of the two plenums 18 is pressurized. Thrust deflector 23 is fixed in place and requires no actuator to rotate it, only an internally located flow control valve. Advantages in this application are similar to the ones from use in the CCW/USB application, namely, rapid deflection of control forces, augmentation of control force, and system simplicity through elimination of moving parts. Thrust reversal without changing the propeller's rotation direction or blade pitch is readily available for use in this application.

Figure 7:
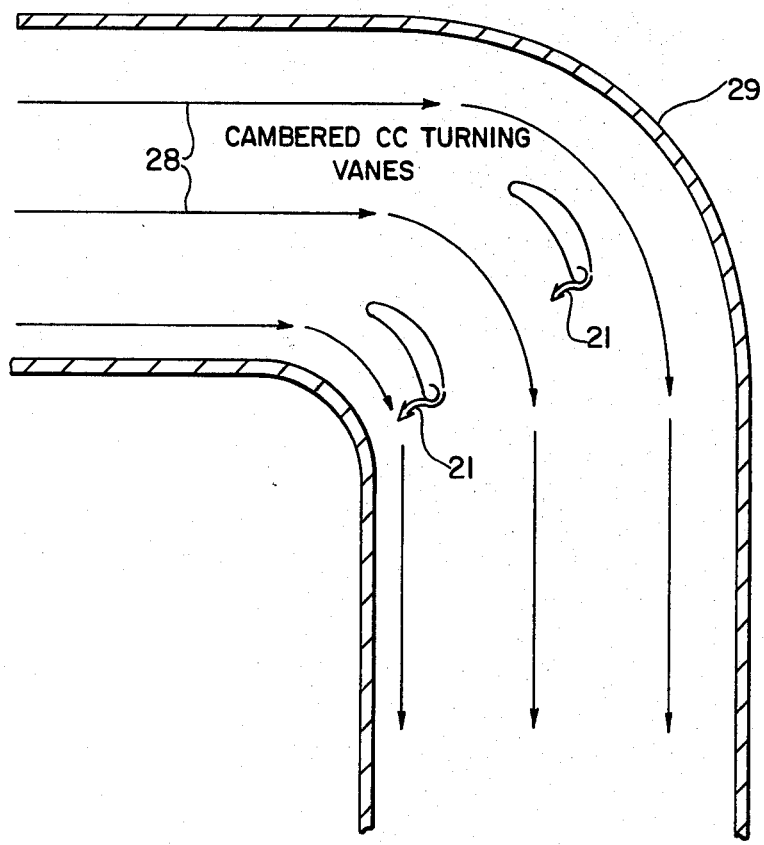
FIG. 7 shows a channel flow turning device.

FIG. 7 shows an application wherein the flow 28 for any fluid is deflected within a restraining channel 29, such as, a pipe, tube, wind tunnel, etc. where effective flow turning is necessary or desired to minimize losses due to flow separation, turbulence, etc. FIG. 7 shows a specific application of applicants' invention illustrating an arrangement where the cascade of turning vanes in a wind tunnel corner has been replaced by single CC airfoil sections which effectively become the 90 degree turning vanes. Similar arrangements are useful in pipes, tubes, and channels.

Figure 8:
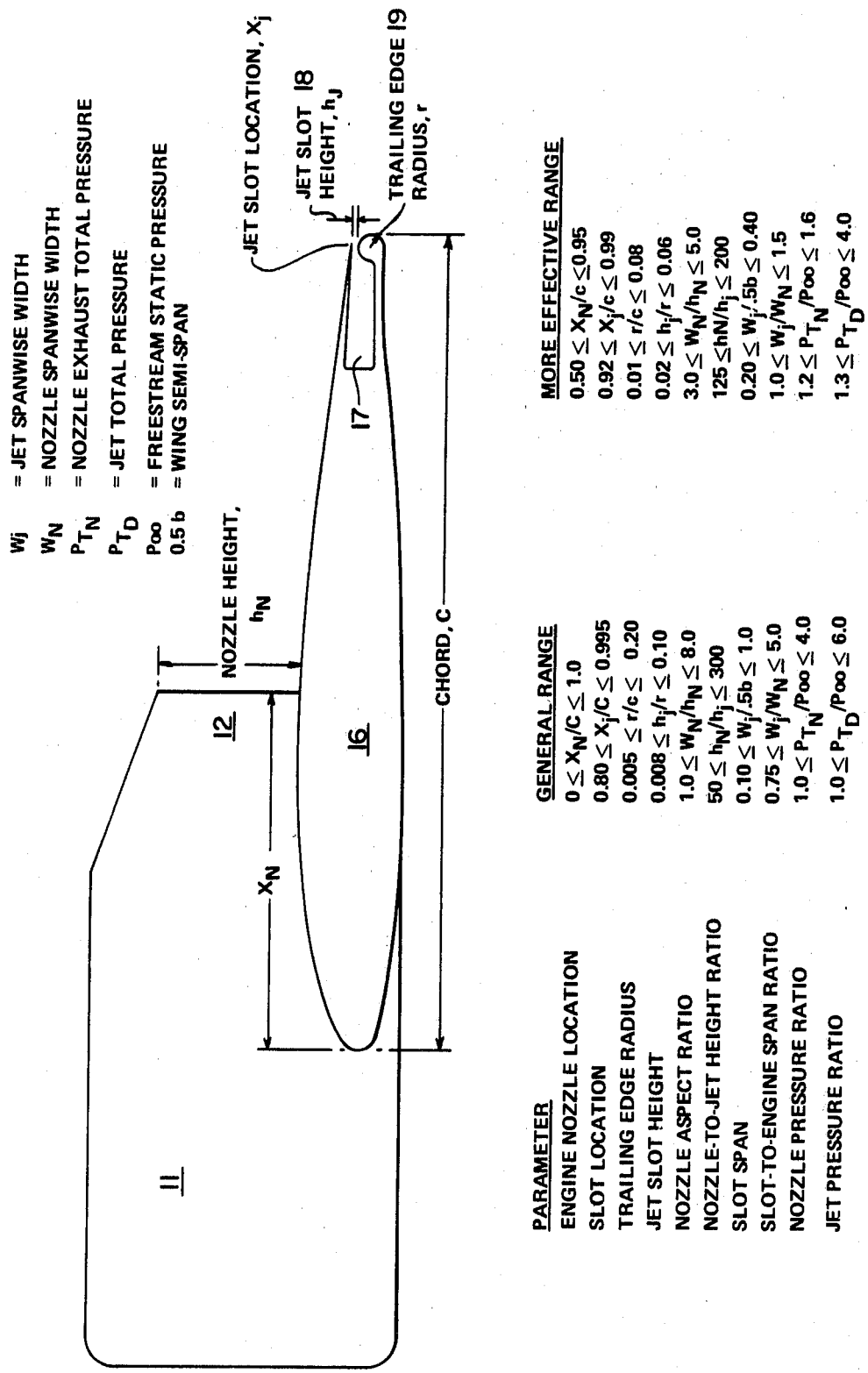
FIG. 8 shows the geometric and operating parameter ranges.

FIG. 8 shows the geometric and operating parameter ranges, which will produce effective operation of the device in FIGS. 1 through 4.

Figure 9:
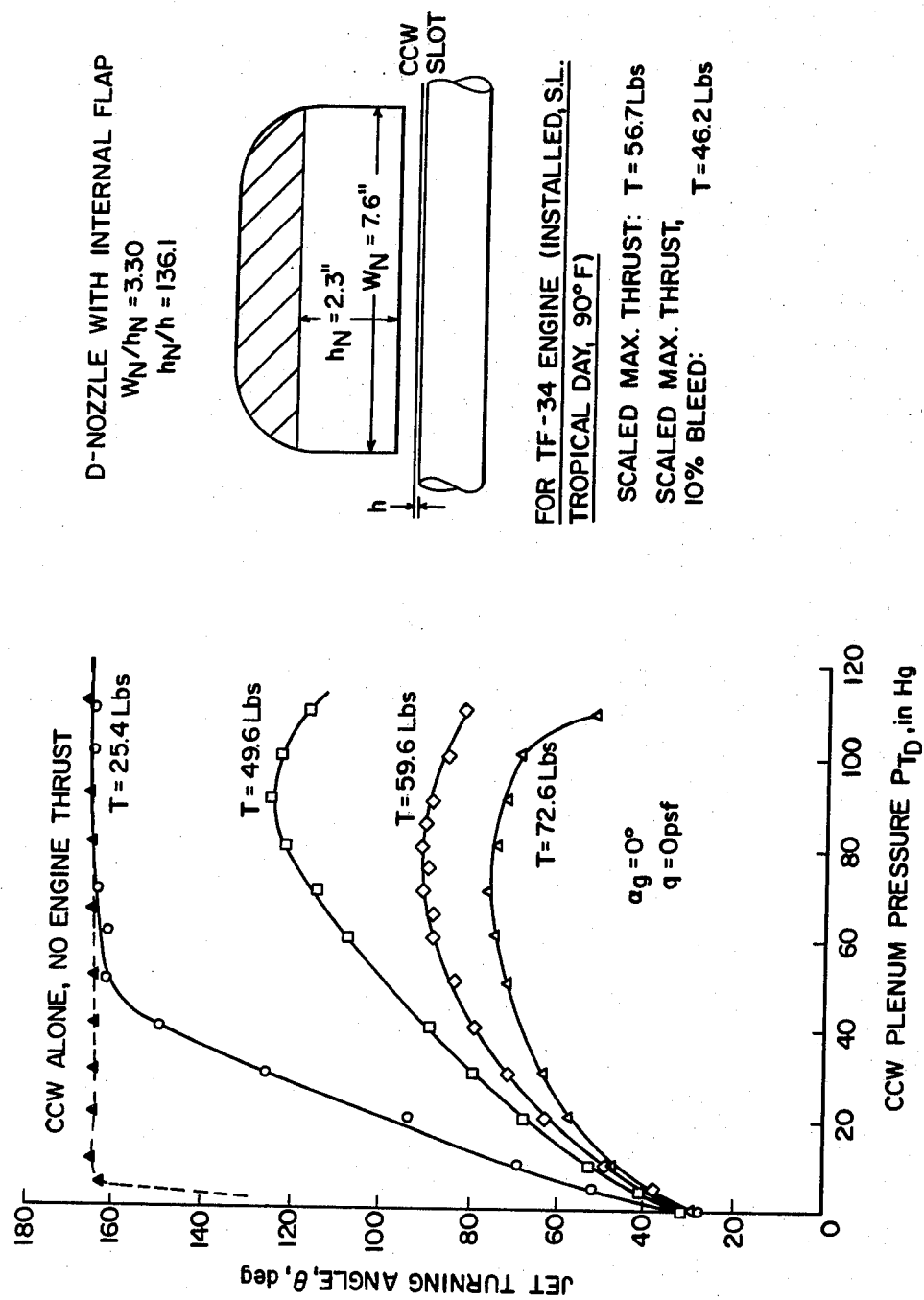
FIGS. 9 and 10 confirm experimental thrust turning results.
Figure 10:
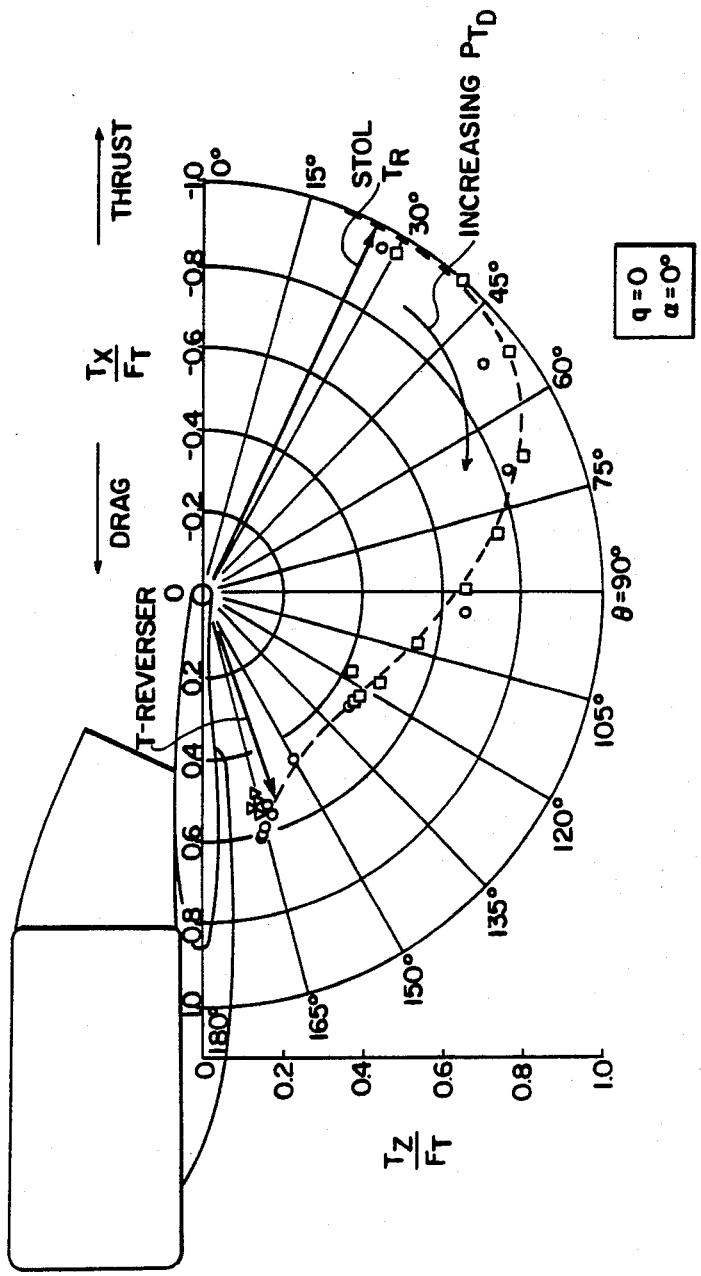

FIGS. 9 and 10 contain experimental thrust turning results of this device. FIG. 9 illustrates the CCW/USB static thrust turning in pressure required to achieve desired deflection angle. FIG. 10 shows the CCW/USB turning angle and thrust recovery efficiency.

Figure 11:
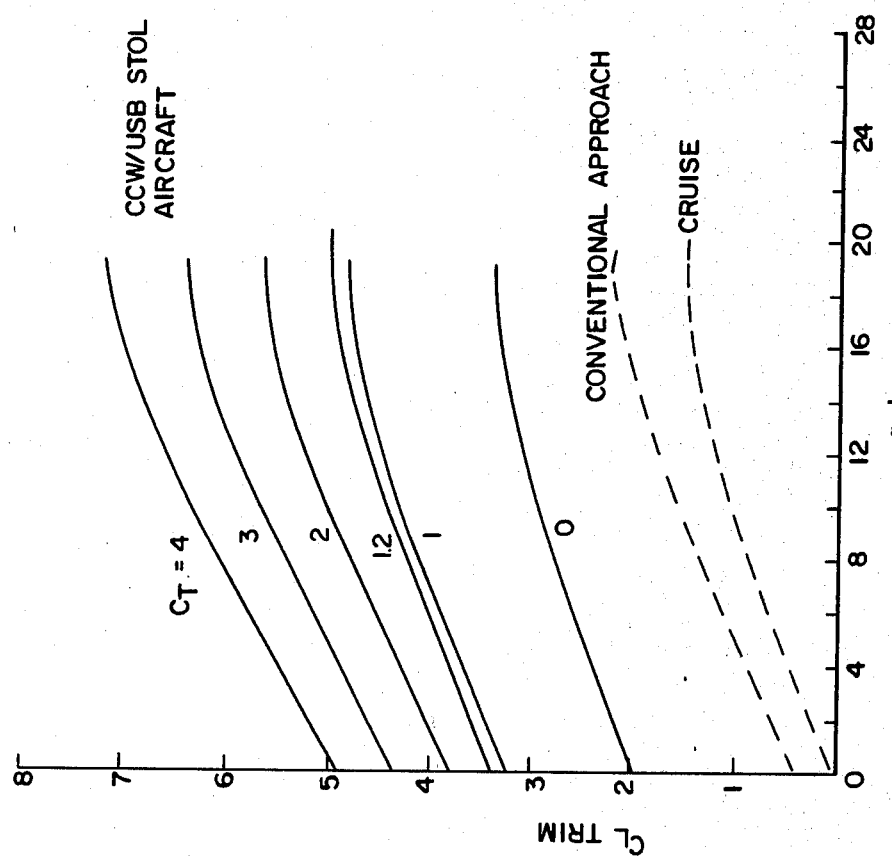
FIG. 11 confirms effective high lift generation.

FIG. 11 confirms effective high lift generation and illustrates the high lift capability of the CCW/USB STOL aircraft.

Alternate variations in the geometry of the CC round trailing edge 19 are desirable to augment system operation and can be utilized under certain circumstances. For example, in one instance, full thrust-reversing capability may not be required, thus a traling edge 19 may be utilized only partially rounded, about a 90 degree segment. A forced separation location less than 180 degree from the slot may be advantageous, such as, for reducing cruise drag and high speed flight. Another alternative, variation in CC slot height and other geometric arrangements are useful in utilizing this invention.

The advantages of this invention are in its simplicity and effectiveness as an aerodynamic/hydrodynamic force deflector/generator which eliminates the complexity, weight and inefficiency of mechanical devices currently used for these purposes. Other advantages will be apparent to those skilled in the art in view of the above teachings.

Obviously, many modifications and variations of the present invention are possible in light of the above teachings. It is therefore to be understood that within the scope of the appended claims the invention may be practiced otherwise than as specifically described.

What is claimed is:

1. A thrust deflection, thrust reversal, and force augmentation device for an aircraft capable of short takeoff and landing and vertical takeoff and landing, comprising:
   an aircraft wing;
   a thrust engine mounted on said wing with the exhaust from said engine traveling over the upper surface of said wing;
   a plenum inside said wing having an inlet connected to a source of gas pressure and an outlet in the trailing edge of said wing;
   said outlet being formed as a slot means between an upper portion and a lower portion:
   said upper portion being a part of the upper surface of said wing and having a reduced thickness near the rear edge;

said lower portion forming the rear wall of the plenum, the lower edge of the slot and the rear edge of said wing, said lower portion being circular in cross section and having a constant radius of between 0.5% and 20% of the chord length of said wing;

said slot means having a smoothly converging nozzle with the portion of said nozzle having the minimum height being at the rear edge of said upper portion, said slot means having a height of between 0.8% and 10% of said radius;

wherein gas from said source of gas pressure is controlled to travel through said plenum, escape through said converging nozzle and slot means and travel along the rear edge of said wing so as to cause said exhaust to be selectively deflected at an angle between 90° and 165° with the deflected exhaust retaining a substantial portion of the original thrust at angles of between 90° and 165°, so that the deflected exhaust acts substantially to slow down and lift the aircraft, allowing a short takeoff and landing capability for deflections near 90° and a vertical takeoff and landing capability for deflections greater than 90°.

2. The thrust deflector and force augmentor in claim 1 further comprising an internal valve to control the flow rate through said slot means and thus control the exhaust deflection angle.

* * * * *